Figure 1:
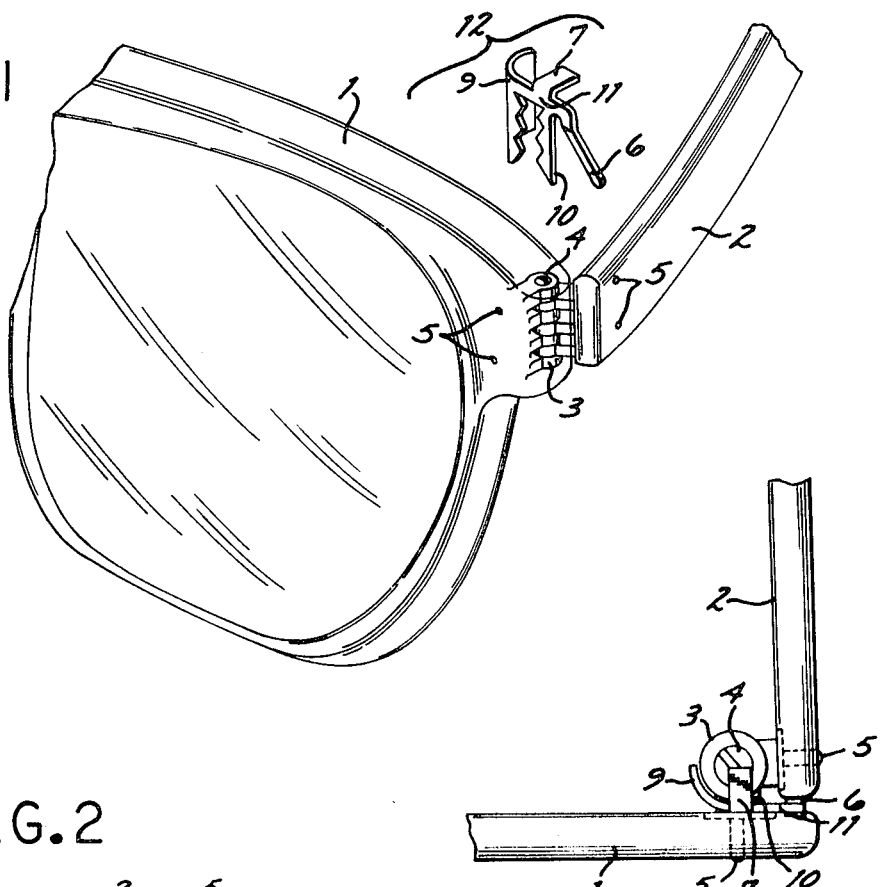

United States Patent

[11] 3,619,043

[72] Inventor Howard Carlyle
 8420 Madison, South Gate, Calif. 90280
[21] Appl. No. 859,897
[22] Filed Sept. 22, 1969
[45] Patented Nov. 9, 1971

[54] TEMPLE TENSIONER AND HINGE SCREW LOCKING DEVICE FOR EYEGLASSES
3 Claims, 5 Drawing Figs.
[52] U.S. Cl. .................................................. 351/113,
 16/169, 351/121
[51] Int. Cl. ...................................................... G02b 5/16
[50] Field of Search ........................................ 351/113,
 141, 153, 121; 16/169, 128

[56] References Cited
 UNITED STATES PATENTS
2,550,348 4/1951 Hansen ....................... 351/113
3,156,757 11/1964 Spina ........................... 351/113

*Primary Examiner*—David Schonberg
*Assistant Examiner*—John W. Leonard
*Attorney*—Fulwider, Patton, Rieber, Lee & Utecht

ABSTRACT: A temple tensioning and hinge screw locking device that is stamped and shaped from steel by a continuous die and then tempered to make a permanent device which may be readily clipped onto the hinge portion of eyeglass frames and held in position either by spring clip action or by a screw, or both, becoming a permanent integral part of the eyeglasses, exerting inward pressure on the temple pieces which extend along the sides of the wearers head, holding the eyeglasses in the prescribed position at all times, and a temple hinge screw lock flange which rests on top of the hinge screw so that said screw cannot loosen or back out.

PATENTED NOV 9 1971　　3,619,043

INVENTOR.
HOWARD CARLYLE
BY Fulwider, Patton Rieber, Lee and Utecht
ATTORNEYS

TEMPLE TENSIONER AND HINGE SCREW LOCKING DEVICE FOR EYEGLASSES

This invention relates to a temple tensioning and hinge screw locking device for eyeglass frame, and more particularly, is directed to a permanent or detachable device adapted to be clipped onto the hinge portion of eyeglass frames, said device exerting an even pressure against the temple pieces for holding the eyeglasses in the prescribed position, and the screw locking flange resting on top of the hinge screw, locking said screw in place. It is the rule that after a short period of time plastic eyeglass frames become distorted or bent either at the bridge or end pieces, or both, whereby the prescribed adjustment is lost, allowing the eyeglass to slide down the wearer's nose. When this condition exists it is very annoying to the wearer, requiring constant repositioning. It is also the rule that repeated opening and closing of the temple pieces causes the hinge screws to loosen or fall out completely. When either or both of the happenings occur the wearer experiences a great amount of discomfort and inconvenience. The realignment of the frame or the replacement of the screw is a time consuming and costly operation for the Optician or Doctor as well as to the wearer, requiring a special trip by the wearer and the time and effort of the Optician or Doctor to remedy the condition. When one considers that approximately 100,000,000 people in the United States wear glasses the time and expense involved is tremendous.

The object of this invention is to keep eyeglass frames in a comfortable wearing condition and to prevent loose or lost screws. Another object is to provide a precision made, simple, inexpensive device that can be readily clipped or fastened to the hinge portion with a screw and without the need of special skill or tools.

Another important object of this device is to provide an improved self adjusting solid spring steel temple tensioning and screw locking device in one unit.

In the past other rubber or rubber coated devices have been utilized endeavoring to remedy one or both of these conditions but have proven unsatisfactorily because of the short life span of the rubber, necessitating frequent replacement, proving costly and ineffective.

This invention embodies other features, details of construction, and arrangement of parts which are hereinafter set forth in the specifications and claims and illustrated in the accompanying drawings.

Referring to the drawings, wherein like members are given the same reference numbers, a spectacle frontal frame 1, and temple 2, are pivotally connected by a hinge 3. The hinge 3, has a screw 4, about which the temple 2, and frontal frame 1, pivot by reason of the hinge plates being secured to the temple 2, and frontal frame 1, respectively, by any suitable means, such as rivets 5, as illustrated.

The invention 12, is shown in position in FIG. 1 to be clipped onto the hinge 3, so that the half circle leg 9, and inner serrated leg 10, are clipped around, embracing either side of hinge 3, in a firm and permanent manner. The screw locking flange 7, rests upon the screw head 4, locking the screw 4, into position. The temple tensioning spring 6, is in position to exert pressure against the butt of the temple 2, when the temple 2, is in open or use position.

FIG. 1 is a perspective view of one side of a spectacle frame 1, showing the method the temple tensioning and screw locking invention 12, is clipped onto the hinge 3, which connects the temple 2, to the frontal frame 1.

Figure 2:
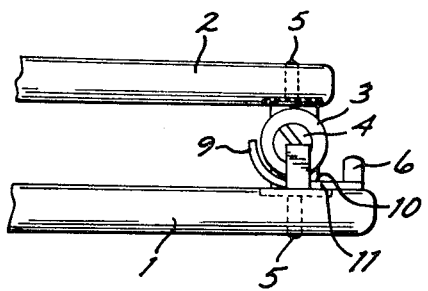

FIG. 2 is a top view of one side of a spectacle frame 1, with the invention 12, clipped over and around the hinge 3, with the temple 2, folded down against the frontal part of the frame 1. The screw locking flange 7, protrudes over the top of the hinge screw 4, locking hinge screw 4, in position. The temple tensioning spring 6, is in a released position.

Figure 3:
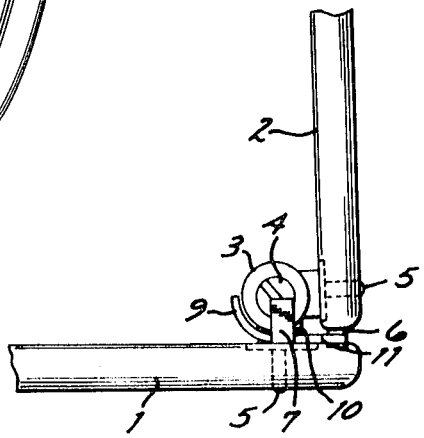

FIG. 3 is a top view of one side of a spectacle frame 1, with the invention 12, clipped over and around the hinge 3, with the temple 2, opened to the use position, showing the butt of the temple 2, compressing the temple tensioning spring 6, developing the desired inward pressure on the temple 2, against the side of the head, and the screw locking flange 7, protruding over the top of the hinge screw 4, thereby locking the screw in place.

Figure 4:
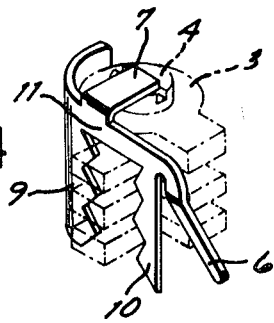

FIG. 4 is a cutaway drawing of the hinge 3, hinge screw 4, the invention 12, and the manner in which the serrated leg 10, and the half circle serrated leg 9, is clipped onto the hinge 3, in a firm and permanent manner. It also shows the released angle of the temple tensioning spring 6, and the screw locking position of the flange 7.

Figure 5:
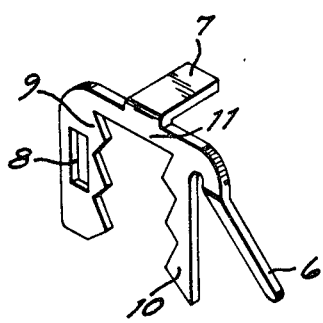

FIG. 5 is a side angled view of the invention 12, showing a variation of the half-circled leg 9, as being flat with a slot 8, so the invention 12, can be secured to the frontal frame 1, by means of a screw through slot 8, and into a threaded hole provided by the frame manufacturer for attaching the invention 12, as a permanent part of the frontal frame 1.

I claim:

1. An integral temple tensioner and hinge screw locking device for eyeglasses having a spectacle frontal frame, a temple, a hinge interposed between said frame and temple and a screw for said hinge, said device comprising:
    a first vertical leg having serrations along one of its edges;
    a second vertical leg having serrations along its edge facing the serrations of said first leg;
    a horizontal cross member connecting said legs;
    a rearwardly extending hinge screw locking flange projecting from said cross member; and
    a rearwardly and downwardly extending temple tensioning spring leg projecting from the end of said cross member opposite said first leg, with said first and second legs straddling said hinge whereby said flange restrains upward movement of said hinge screw and said spring leg abuts said temple when the latter is in its open position.

2. A device as set forth in claim 1 wherein said first leg is bent in a half circle rearwardly around said hinge.

3. A device as set forth in claim 1 wherein said first leg is secured to said frontal frame.

* * * * *